Figure 1:
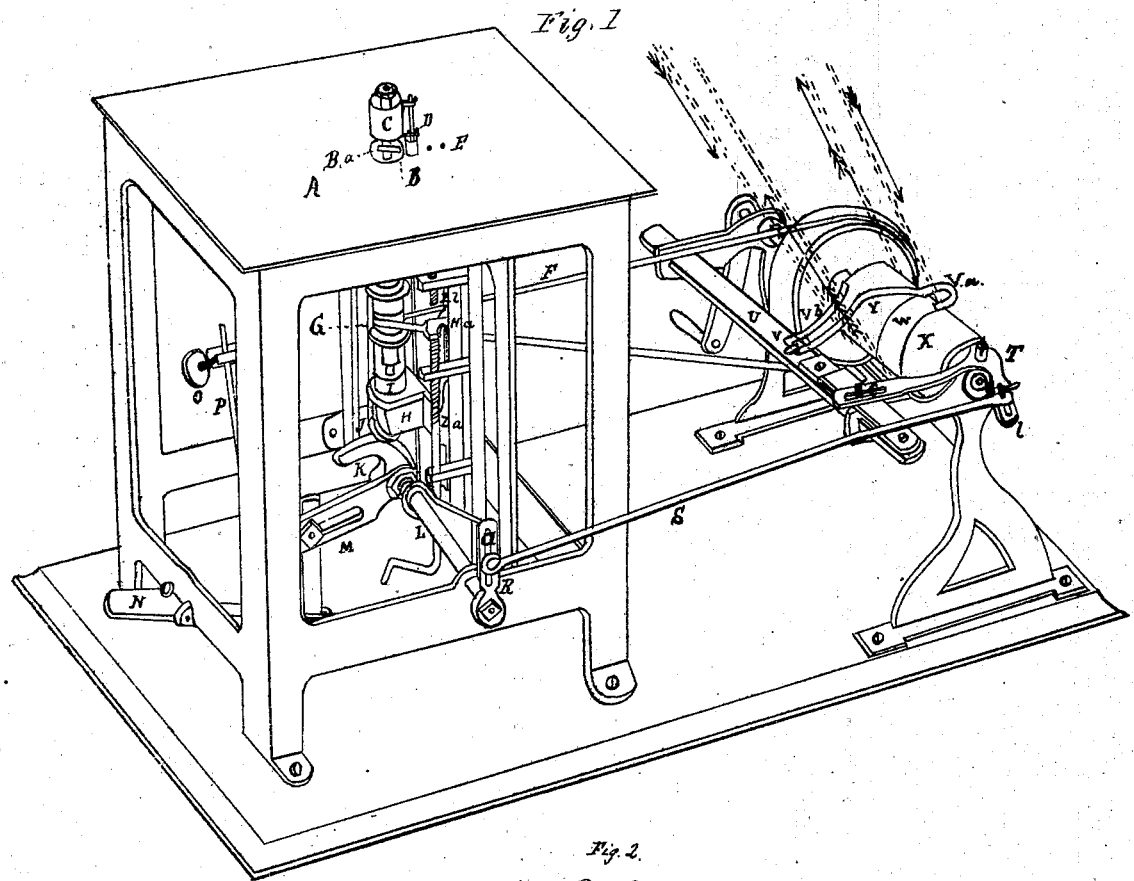

D. A. Harris.
Wood-Planing Mach.
No 74,218. Patented Feb. 11, 1868.

Witnesses.
Samuel J. Parker
J. J. McElheny

Inventor.
David A. Harris

United States Patent Office.

DAVID A. HARRIS, OF ITHACA, NEW YORK.

Letters Patent No. 74,218, dated February 11, 1868.

IMPROVEMENT IN WOOD-PLANING MACHINES.

*The Schedule referred to in these Letters Patent and making part of the same.*

TO ALL WHOM IT MAY CONCERN:

Be it known that I, DAVID A. HARRIS, of Ithaca, Tompkins county, New York, have invented an Improved Moulding and Shaping-Machine; and I do hereby declare that the following is a full and exact description thereof, reference being had to the annexed drawings, and to the letters thereon.

My object is to revolve on one mandrel two sets of cutters or tools, for the purpose of cutting in opposite ways at pleasure. For this I employ several devices.

First. I make a double bead, or attach to the head of the mandrel two sets of cutters or tools, made by one pattern or gauge, with the one set to cut when the mandrel revolves in one direction, and the other set to cut when the revolution of the mandrel is in the opposite way, and fix them both to the mandrel by washers and burrs.

Second. I use means to revolve the mandrel at pleasure, in diverse directions. This I accomplish by a device which changes two belts on three pulleys, and which is operated by a foot-treadle.

Third. I cut in the same plane or place by either set of bits or tools at pleasure. To do this, I make the mandrel on which they are fixed promptly adjustable by an upward or downward motion given to it by sliding a gate or frame on which the mandrel is fixed. This change is also effected by the same foot-treadle just named, so that both change of direction of revolution and sets of cutters or tools takes place at once, and nearly instantaneously.

Fourth. I make precise the point of the cutting of each set of bits or tools. This is done by two set-screws which limit and make, with precision, the extent of the upward and downward motion of the mandrel, by its frame, so that each set of tools cuts in the same place or plane.

Fifth. I make accurate the line of motion of the mandrel or arbor. This I accomplish by fixing it on a gate or frame as aforesaid, and sliding the frame in ways or grooves accurately made.

Sixth. As the distance the arbor or mandrel moves is variable with the width of the space to be cut, and as the extent of the motions to change the belting is a fixed one, always the same to the same width of belts, I make adjustments to meet this. These are, by giving the foot-treadle the same constant motion, but varying that of the mandrel by a cam, beneath the frame in which it is placed, and acts in conjunction with the set-screws of the said frame, and the arms, angle, and rod connecting the belt-slide and foot-treadle.

Seventh. Often I wish to fix the belting and the mandrel in a certain position. This I effect by a fixing-rod and set-screw, connected with the treadle and its associated parts, so that it acts on the whole, and fastens them in any given place. These several facts and others are seen in the drawings, where—

Figure 1 is a perspective view of my machine, and

Figure 2:
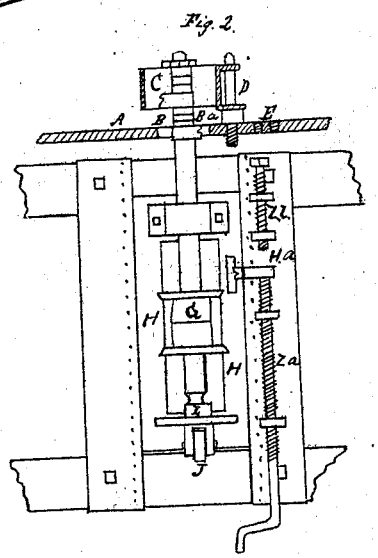

Figure 2 a view of my mandrel and its immediate attachments.

In fig. 1, A is the table on which the work rests while being cut, and B is one set of cutters seen beneath the hollow finger-guard C, which is held on the stud D, which stud is movable by being put in the holes E, so as to suit various sizes and heights of various tools. At F is the belt, which, coming from a large fixed pulley on the pulley-shaft in rear of the machine, propels the mandrel G by the pulley on it. The mandrel is fixed to the frame H, and plays in a step, I, at its base. The frame rests by a friction-roller, J, on the cam K, which cam is on one end of the shaft L. An arm, M, makes connection with the treadle N. By this means the foot of the operator brings the lower set of cutters into the cutting-space B $a$, and the withdrawal of the foot-pressure lets the upper sets of tools down into the cutting-space B $a$, through the hollow finger-guard C; so that at pleasure, either set of tools on the mandrel-head is brought into action, the precise spot of the cutting-space B $a$ being fixed by the set-screws Z $a$ and Z $b$, which have between them the stud H $a$, from the frame or slide H. At O is a set-screw in a fixed piece from the frame of the machine, through which the treadle-rod P passes. Its use is to fasten, as aforesaid, the treadle, mandrel, cutters, and also the belting, in any desirable position. On the outer end of the shaft L is the arm R, with the slot $a$ in it, where one end of the rod S makes connection. The further end of this rod connects with a stud in the slot $b$ of the angle T, on the belt-shaft hangers. The further arm of the angle is fast to the slide-bar U, which has the double-belted changing-rod V. The pulley W is fixed, and the pulleys X and Y are loose, and their use is for two belts moving in opposite directions, through the loops in V, as indicated by the red dotted lines. The loop V $a$ receives the belt with the blue arrow, and represents that belt as moving the pulley W in the direction of the arrow. When a change is made, the belt with the red arrow through the loop V b, moves the fixed pulley, as the arrow indicates. The action of these last-described parts is, that as the cutters move a variable distance with each space to be cut, the belts to change and reverse the mandrel by its belt F may be in the same and a constant manner acted on by the treadle N, as aforesaid, the cam K being not always acting fully on the mandrel-frame H, as described.

In fig. 2, the letters refer to the parts already named. The mandrel and its cutters or tools, the sliding frame, and certain other parts, are more clearly seen than in fig. 1.

The other uses of my machine are apparent to those skilled in the art to which it appertains.

Claims.

1. The arrangement and construction of the treadle N, slotted lever M, and cam K on the shaft L, slide or frame H, and mandrel in the slide or frame, so that the treadle raises and lets fall the tools on the mandrel, substantially as and for the purposes set forth.

2. The arrangement and construction of the treadle N, lever M, shaft L, cam K, slide H and its mandrel, in connection with the slotted lever R, rod S, angle T, slide U, pulleys W X Y, and two belts changeable by the guides V thereon, for reversing the direction of the revolution of the mandrel and tools, and bringing into action either set of tools at pleasure, substantially as and for the purposes set forth.

3. The arrangement of the treadle, treadle-lever, and cam, mandrel, tools, slide, guide-rod, and belts, in connection with the fixing-rod P, that the changeable belts can be run and not the mandrel, or the mandrel and tools, uniformly and constantly, for any given time, substantially as set forth.

DAVID A. HARRIS.

Witnesses:
   SAMUEL J. PARKER,
   T. J. McELHENY.